United States Patent
Taaghol et al.

(10) Patent No.: US 8,644,215 B2
(45) Date of Patent: Feb. 4, 2014

(54) GENERIC WIRELESS SERVICES DISCOVERY

(75) Inventors: Pouya Taaghol, San Jose, CA (US); Muthaiah Venkatachalam, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1267 days.

(21) Appl. No.: 12/128,892

(22) Filed: May 29, 2008

(65) Prior Publication Data

US 2008/0310381 A1     Dec. 18, 2008

Related U.S. Application Data

(60) Provisional application No. 60/944,052, filed on Jun. 14, 2007.

(51) Int. Cl.
*H04W 4/00* (2009.01)

(52) U.S. Cl.
USPC .......................................................... 370/328

(58) Field of Classification Search
USPC .......................................... 370/328, 312, 338
See application file for complete search history.

(56) References Cited

U.S. PATENT DOCUMENTS

| | | | |
|---|---|---|---|
| 7,003,555 B1 * | 2/2006 | Jungck | 709/219 |
| 7,372,827 B2 * | 5/2008 | Suwa | 370/328 |
| 2007/0100998 A1 * | 5/2007 | Ramadan et al. | 709/225 |
| 2007/0254661 A1 * | 11/2007 | Chowdhury et al. | 455/436 |
| 2010/0303064 A1 | 12/2010 | Bari | |

OTHER PUBLICATIONS

Non-Final Office Action for U.S. Appl. No. 12/130,358 mailed Apr. 5, 2011, 9 pages.
"First Report and Order and Notice of Proposed Rulemaking", Federal Communications Commision, (May 19, 2005), 91 pages.
"Part 16: Air Interface for Fixed and Mobile Broadband Wireless Access Systems", Amendment 2: Physical and Medium Access Control Layers for Combined Fixed and Mobile Operation for Licensed Bands, IEEE, (2006), 864 pages.
"Series E: Overall Network Operation, Telephone Service, Service Operation and Human Factors", International operation—Numbering plan of the international telephone service, ITU-T Recommendation E. 164—Supplement 4, (May 2003), 18 pages.
Aboba, B., et al., "Extensible Authentication Protocol (EAP)", The Internet Society, (Jun. 2004), 68 pages.

* cited by examiner

*Primary Examiner* — Mark Rinehart
*Assistant Examiner* — Mohammad Anwar
(74) *Attorney, Agent, or Firm* — Blakely, Sokoloff, Taylor & Zafman LLP

(57) ABSTRACT

Embodiments of the invention relate to wireless communications. More particularly, embodiments of the invention relate to generic discovery mechanisms that may be utilized in wireless communications.

19 Claims, 5 Drawing Sheets

GENERIC WIRELESS SERVICES DISCOVERY

This application claims priority to U.S. Provisional Patent Application No. 60/944,052 filed Jun. 14, 2007 entitled, "GENERIC WIRELESS SERVICES DISCOVERY."

TECHNICAL FIELD

Embodiments of the invention relate to wireless communications. More particularly, embodiments of the invention relate to generic discovery mechanisms that may be utilized in wireless communications.

BACKGROUND

When a mobile device engages in wireless communications, the mobile device must discover what services are available. The mobile device may then determine whether the services are compatible and/or what services may be provided by the mobile device. Currently, available services are discovered by the mobile device receiving a service advertisement from a network node, for example, a base station. When many services are offered, the complexity of the client device may increase, which may increase the cost associated with the mobile device.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The generic discovery services described herein may be applicable to any wireless communications network. For example, the wireless network may be a Worldwide Interoperability for Microwave Access (WiMAX) network. WiMAX is defined by standards available from the WiMAX Forum, formed in June 2001 to promote conformance and interoperability of the IEEE 802.16 standard, officially known as WirelessMAN. IEEE 802.16 corresponds to IEEE 802.15-2005 entitled "Air Interface for Fixed Broadband Wireless Access Systems" approved Dec. 7, 2005 as well as related documents. Other wireless network protocols may also be supported including, for example, Time Division, Multiple Access (TDMA) protocols, Global System for Mobile Communications (GSM) protocols, Code Division, Multiple Access (CDMA) protocols, and/or any other type of wireless communications protocol.

Figure 1:
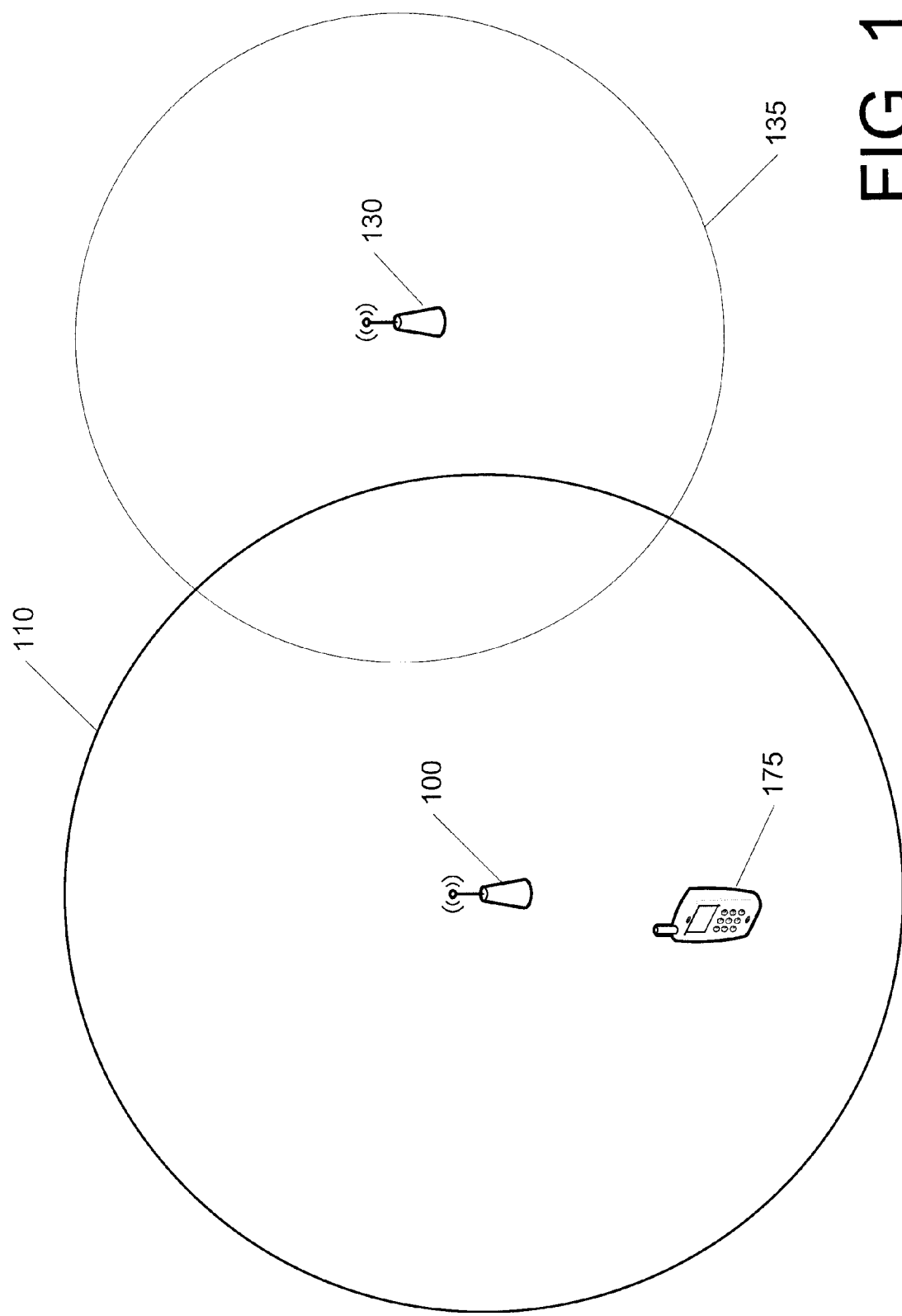
FIG. 1 is a conceptual diagram of one embodiment of a wireless network.

FIG. 1 is a conceptual diagram of one embodiment of a wireless network. The wireless network may support communications utilizing WiMAX and/or any other type of protocol. The wireless network may be used, for example, for cellular voice communications and/or data transfer.

Base station 100 may provide an access point for wireless communications for one or more mobile wireless devices such as, for example, wireless mobile device 175. Any number of wireless mobile devices may be supported. A wireless mobile device may be, for example, a cellular telephone, a laptop computer, a personal digital assistant, a smart phone, or any other wireless-enabled device. Base station 100 may have a range (e.g., 1 km) corresponding to cell 110.

As mobile wireless device 175 moves within cell 110, it may communicate with base station 100. If mobile wireless device 175 exits cell 110, it may be transferred to another base station. For example, if mobile wireless device 175 moves toward base station 130 and moves within cell 135, mobile wireless device 175 may be handed over to base station 130. In general, handovers have an associated overhead that may consume network resources.

Mobile wireless device 175 may be any type of electronic device configured to communicate using a wireless communications protocol. In one embodiment, mobile wireless device 175 may be a cellular enabled device (e.g., cellular telephone, smartphone, cellular-enabled personal digital assistant). In another embodiment, mobile wireless device 175 may be a mobile computing device (e.g., a laptop computer, a palmtop computer).

When mobile wireless device 175 interacts with a base station, wireless mobile device may discover the services provided by the base station. Described herein is a generic mechanism by which mobile wireless device 175 can discover the relevant services available. In general, the mechanism may be robust enough that it can work for various scenarios including, but not limited to, roaming as well as non-roaming, Common Management Information Protocol (CMIP), Proxy Mobile Internet Protocol (PMIP), Internet Protocol version 4 (IPv4), Internet Protocol version 6 (IPv6), etc.

The services discovered may include, but are not limited to, Voice over IP (VoIP), Multicast and Broadcast Service (MBS), and Location Based Service (LBS). Other services may also be supported. While the examples herein are generally associated with WiMAX, the generic discovery techniques are applicable to other wireless protocols as well.

Figure 2:
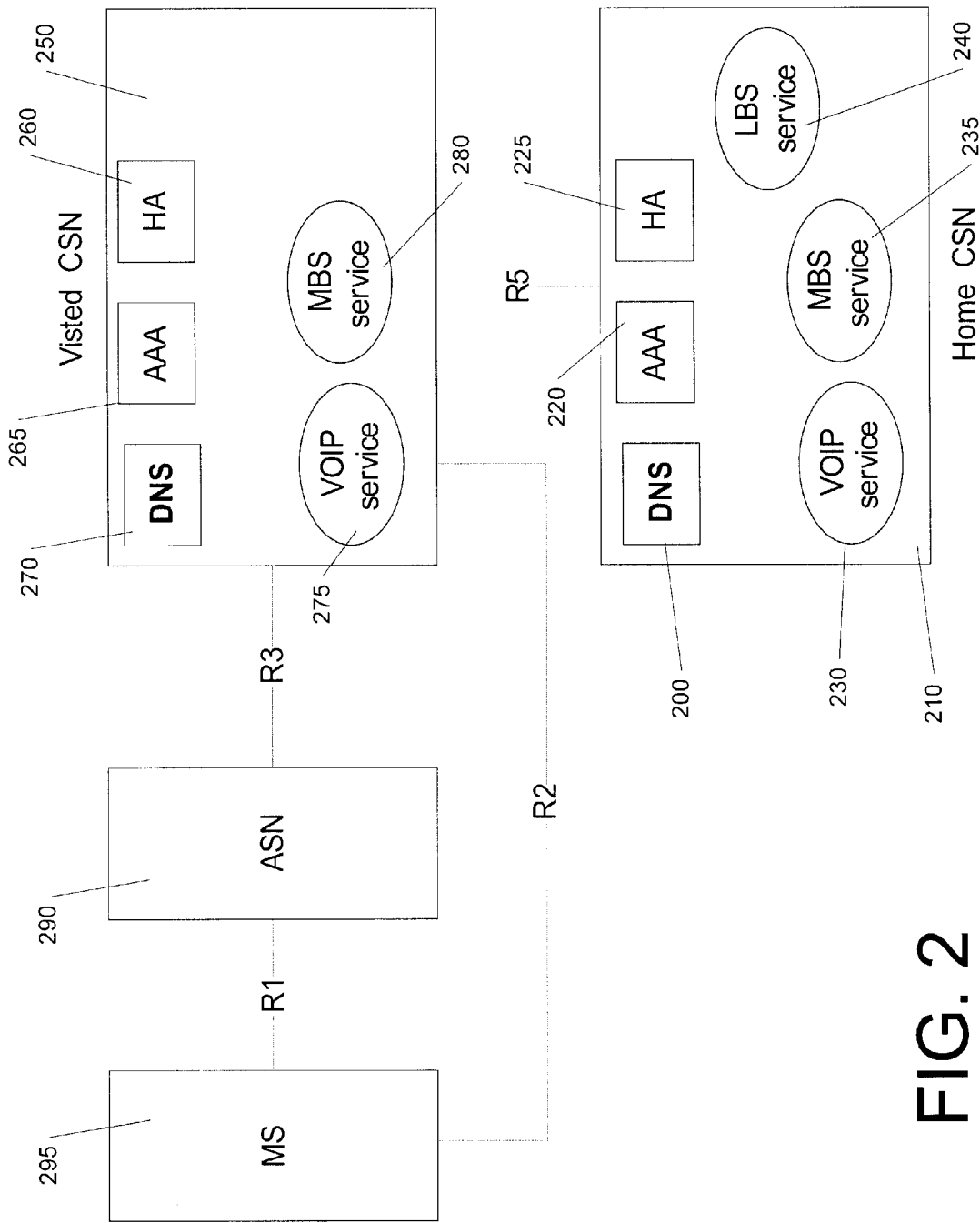
FIG. 2 is a block diagram of one embodiment of a WiMAX network.

FIG. 2 is a block diagram of one embodiment of a WiMAX network. In one embodiment the WiMAX network has a domain name server (DNS) 200 local to the home connectivity service network (CSN) 210. The local DNSconfiguration may be pushed to the mobile device when it obtains its Home Address (HoA), Care of Address (CoA) and/or Point of Attachment (PoA). The home CSN 210 may also include authentication, authorization and accounting (AAA) server 220 and home agent (HA) server 225. The home CSN 210 may also include Voice Over IP (VoIP) services 230, Multicast and Broadcast services (MBS) 235 and/or Location Based Services (LBS) 240. Home CSN 210 may include additional, fewer, or different servers and services.

In one embodiment, visited CSN 250 may include DNS server 270, AAA server 265, HA server 260. Visited CSN 250 may also provide VoIP services 275 and MBS service 280 that function as described above. Visited CSN 250 may include additional, fewer, or different servers and services.

In one embodiment, the DNS can resolve Universal Resource Indicators (URIs) to a local IP server on the WiMAX network. The table below illustrates one technique to inform the mobile device 295 of the DNS configuration under various connection types.

| Type | DNS push mechanism |
|---|---|
| IPv4/PMIPv4 | DHCP options. |
| CMIPv4 | MIP options<br>Alternatively, even though HOA is obtained via MIP, the mobile device can also use DHCP to obtain DNS configuration information. |
| IPv6/PMIPv6 | DHCPv6 options |
| CMIPv6 | MIP6 options<br>Alternatively, even though HOA is obtained via MIP, the mobile device can also use DHCP to obtain DNS configuration information. |

In one embodiment, if a particular service is not offered by the WiMAX network, the local DNS can return the standard DNS name resolution error.

In another embodiment, when the mobile device 295 obtains an IP address using DHCP, the IP address of the local servers can be sent via DCHP using DHCP options in the form of a list. For example, the list may read, "IP1, IP2, ... IPn" where n is the maximum number of services supported and each IP address indicates a server corresponding to an available service. For example, IP1 may be the address of a VoIP server while IP2 is the address of a MBS server. If the network does not offer a particular service, the IP address may be a designated value, for example, 0.0.0.

When the mobile device 295 receives the list it can parse the list. The mobile device will then be able to determine what services are offered on the network and/or obtain the IP address of the relevant servers for the services that are offered. In one embodiment, an autonomous system number 290 is used to communicate with the mobile device 295. Once the available servers/services are determined by the mobile device 295, the available servers/services may be accessed by the mobile device 295 using the IP addresses provided in the list.

Figure 3:
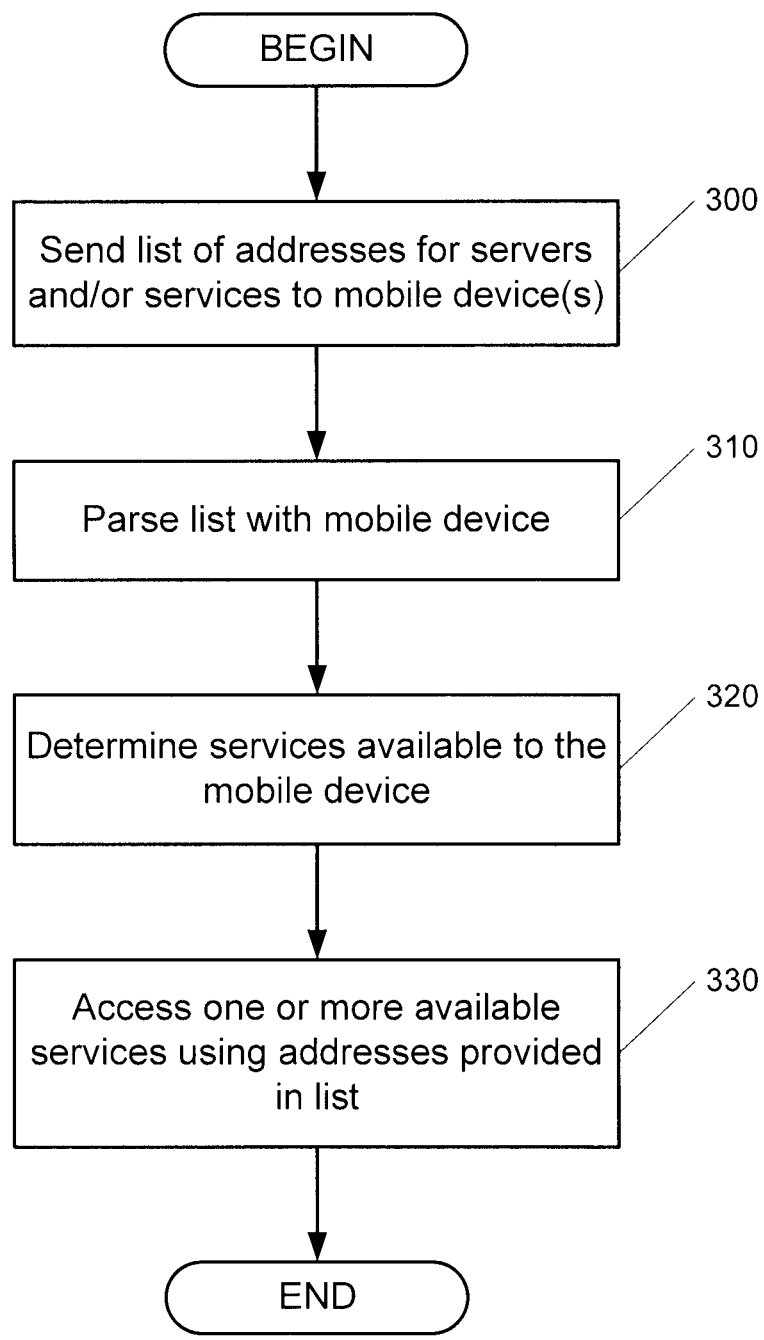
FIG. 3 is a flow diagram of one embodiment of a technique for generic services discovery within a wireless network.

FIG. 3 is a flow diagram of one embodiment of a technique for generic services discovery within a wireless network. The operations of FIG. 3 may be performed by, for example, one or more mobile electronic devices such as those described herein. The operations of FIG. 3 may be performed, for example, by hardware components and/or software executed by a processing component of the mobile electronic devices.

One or more lists of servers and/or services available are transmitted to one or more mobile devices, 300. In one embodiment, option fields on in various formats may be utilized. The list may include servers available to the mobile device(s) and/or services available to the mobile device(s). Additional related information may also be available to the mobile device(s).

The one or more mobile devices can then parse the received list, 310. The mobile devices may parse the information received in the list in any manner known in the art. The mobile devices then have extracted information related to severs and/or services available to the mobile devices without the mobile devices being required to discovered in the manner utilized by the prior art.

From the information extracted from the provided list, the mobile devices can determine the services available to it, 320. The mobile devices can then access the available services, 330. Thus, a less complex and more efficient technique to determine the services available to the mobile devices has been described.

Figure 4:
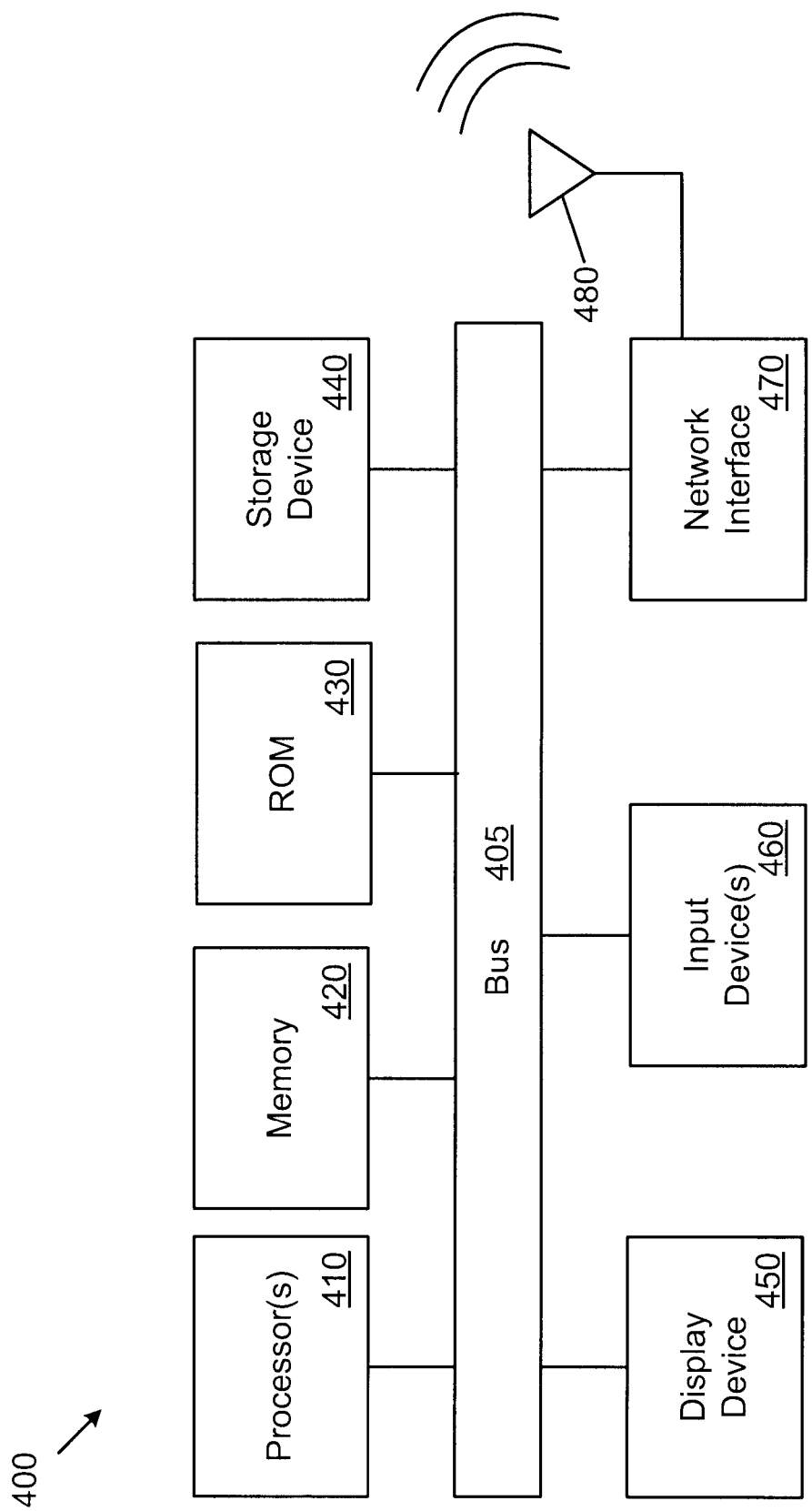
FIG. 4 is a block diagram of one embodiment of a mobile electronic device.

FIG. 4 is a block diagram of one embodiment of a mobile electronic device. Alternative electronic devices can include more, fewer and/or different components. In one embodiment, the electronic device of FIG. 4 is a mobile device that may function as the mobile device of FIG. 1. In one embodiment, the mobile device is a smartphone or other cellular-enabled device.

Electronic system 400 includes bus 405 or other communication device to communicate information, and processor 410 coupled to bus 405 to process information. While electronic device 400 is illustrated with a single processor, electronic device 400 can include multiple processors and/or co-processors. Electronic device 400 further includes random access memory (RAM) or other dynamic storage device 420 (referred to as memory), coupled to bus 405 to store information and instructions to be executed by processor 410. Memory 420 also can be used to store temporary variables or other intermediate information during execution of instructions by processor 410.

Electronic device 400 also includes read only memory (ROM) and/or other static storage device 430 coupled to bus 405 to store static information and instructions for processor 410. Data storage device 440 is coupled to bus 405 to store information and instructions. Data storage device 440 such as a magnetic disk or optical disc and corresponding drive can be coupled to electronic device 400.

Electronic device 400 can also be coupled via bus 405 to display device 450, such as liquid crystal display (LCD) or other display device, to display information to a user. Input device(s) 460 may include any type of user input device and may be coupled to bus 405 to communicate information and command selections to processor 410. Electronic device 400 further includes network interface 470 to provide access to a network, such as a local area network. Network interface 470 may include one or more antennae 480 to communicate utilizing wireless protocols.

Figure 5:
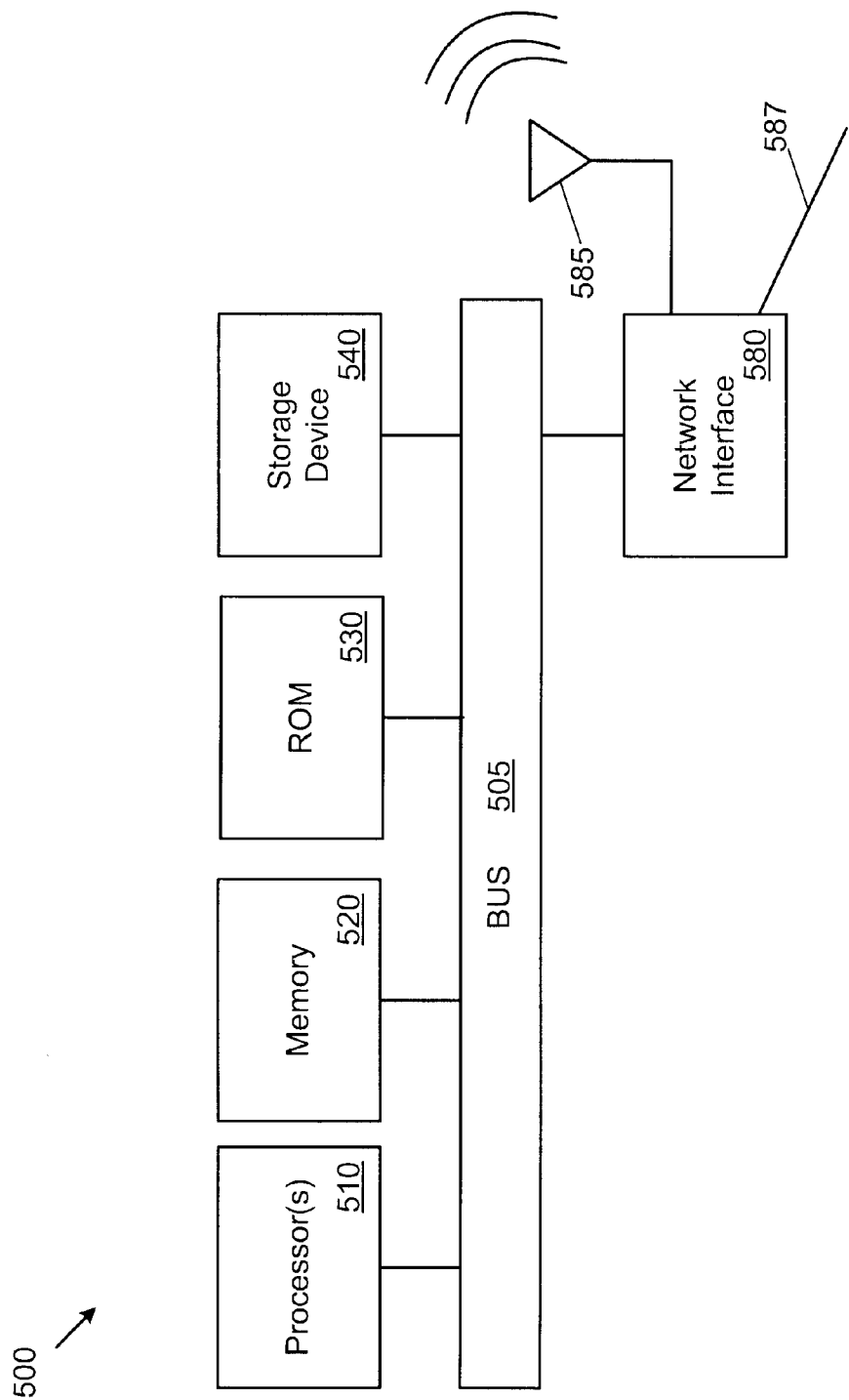
FIG. 5 is a block diagram of one embodiment of a base station.

FIG. 5 is a block diagram of one embodiment of a base station. The base station illustrated in FIG. 4 is intended to represent a range of base stations. Alternative base stations may include more, fewer and/or different components.

Base station 500 may include bus 505 or other communication device to communicate information, and processor 510 coupled to bus 505 that may process information. While base station 500 is illustrated with a single processor, base station 500 may include multiple processors and/or co-processors. Base station 500 further may include random access memory (RAM) or other dynamic storage device 520, coupled to bus 505 and may store information and instructions that may be executed by processor 510. For example, the process of FIG. 4 may be implemented as instructions stored in memory 520 that are executed by processor 510. Memory 520 may also be used to store temporary variables or other intermediate information during execution of instructions by processor 510.

Base station 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to base station 500.

Base station 500 further may include network interface(s) 580 to provide access to a network. Network interface(s) 580 may include, for example, a wireless network interface having antenna 585, which may represent one or more antenna(e)

that may communicate utilizing any of the protocols described herein. Network interface(s) 580 may also include, for example, a wired network interface to communicate with remote devices via network cable 587, which may be, for example, an Ethernet cable, a coaxial cable, a fiber optic cable, a serial cable, or a parallel cable.

A computer-readable medium includes any mechanism that provides (e.g., memory 520, ROM 530, storage device 540) content (e.g., computer executable instructions) in a form readable by an electronic device (e.g., a computer, a personal digital assistant, a cellular telephone). For example, a computer-readable medium includes read only memory (ROM); random access memory (RAM); magnetic disk storage media; optical storage media; flash memory devices, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system to provide a generic mechanism by which a mobile wireless device discovers relevant available services, the system comprising:
   the mobile wireless device configured to communicate in a WiMAX network via an IEEE 802.16-compliant wireless communication protocol; and
   a base station configured to transmit via the wireless communication protocol to the mobile wireless device a list of addresses,
   wherein addresses, in the list of addresses, correspond to servers to provide respective services to the mobile wireless device, the addresses communicated in one or more option fields selected based on a connection type from a plurality of connection types, wherein the plurality connection types include CMIPvx or PMIpvx types, where 'x' is an integer, and wherein the mobile wireless device uses at least one of the services by accessing the corresponding address provided in the list of addresses.

2. The system of claim 1, wherein the list addresses comprises a list of Internet Protocol (IP) addresses.

3. The system of claim 2, wherein the mobile device is operable to access the servers for services using the IP addresses provided in the list of addresses.

4. The system of claim 1, wherein the respective services provided by the servers include at least one of:
   Voice over IP (VoIP);
   Multicast and Broadcast Service (MBS); or
   Location Based Service (LBS).

5. A system to provide a generic mechanism by which a mobile wireless device discovers relevant available services, the system comprising:
   the mobile wireless device configured to communicate in a WiMAX network via an IEEE 802.16-compliant wireless communication protocol; and
   a wireless network having a connectivity service network to provide domain name services to network devices, wherein the connectivity service network causes domain name configuration information to be pushed to the mobile wireless device, in one or more option fields selected based on a connection type, to allow the mobile wireless device to access network services using the domain name configuration information, and wherein the connection types is from a plurality of connection types, wherein the plurality of connection types include CMIPvx or PMIpvx types, where 'x' is an integer.

6. The system of claim 5, wherein the domain name configuration information is pushed to the mobile wireless device using DHCP options and IPv4.

7. The system of claim 5, wherein the domain name configuration information is pushed to the mobile wireless device using DHCP options and PMIPv4.

8. The system of claim 5, wherein the domain name configuration information is pushed to the mobile wireless device using MIP options and CMIPv4.

9. The system of claim 5, wherein the domain name configuration information is pushed to the mobile wireless device using DHCPv6 options and IPv6.

10. The system of claim 5, wherein the domain name configuration information is pushed to the mobile wireless device using DHCPv6 options and PMIPv6.

11. The system of claim 5, wherein the domain name configuration information is pushed to the mobile wireless device using MIP options and CMIPv6.

12. A method to provide a generic mechanism by which a mobile wireless device discovers relevant available services, the method comprising:
    receiving domain services configuration information from a WiMAX network having a connectivity service network via a wireless communications protocol, the information communicated in one or more option fields selected based on a connection type from a plurality of connection types, wherein the plurality of connection types include CMIPvx or PMIpvx types, where 'x' is an integer; and
    accessing network services using the domain name configuration information.

13. The method of claim 12, wherein the wireless communications protocol comprises an IEEE 802.16-compliant protocol.

14. The method of claim 12, wherein the domain name configuration information is pushed to the mobile wireless device using DHCP options and IPv4.

15. The method of claim 12, wherein the domain name configuration information is pushed to the mobile wireless device using DHCP options and PMIPv4.

16. The method of claim 12, wherein the domain name configuration information is pushed to the mobile wireless device using MIP options and CMIPv4.

17. The method of claim 12, wherein the domain name configuration information is pushed to the mobile wireless device using DHCPv6 options and IPv6.

18. The method of claim 12, wherein the domain name configuration information is pushed to the mobile wireless device using DHCPv6 options and PMIPv6.

19. The method of claim 12, wherein the domain name configuration information is pushed to the mobile wireless device using MIP options and CMIPv6.

* * * * *